United States Patent
Hughes et al.

(10) Patent No.: US 6,224,152 B1
(45) Date of Patent: May 1, 2001

(54) SUPPORT FOR BABY

(76) Inventors: Tammy Sue Hughes; Brett Douglas Hughes, both of Rte. 8 Box 813, Burnsville, NC (US) 28714

( * ) Notice: Subject to any disclaimer, the term of this patent is extended or adjusted under 35 U.S.C. 154(b) by 0 days.

(21) Appl. No.: 09/570,351

(22) Filed: May 12, 2000

(51) Int. Cl.[7] ................................................ A47D 1/10
(52) U.S. Cl. ................................ 297/256.17; 297/219.12
(58) Field of Search ............................. 297/219.12, 229, 297/256.17, 411.24, 485

(56) References Cited

U.S. PATENT DOCUMENTS

| | | |
|---|---|---|
| 3,489,194 | 1/1970 | Hoover . |
| 4,416,462 * | 11/1983 | Thompson ................... 297/256.17 X |
| 4,566,130 | 1/1986 | Coates . |
| 4,698,862 | 10/1987 | Mairs . |
| 4,723,300 | 2/1988 | Aranow . |
| 4,824,168 * | 4/1989 | Makoski ................................ 297/229 |
| 4,886,150 | 12/1989 | Fitzsimmons . |
| 4,917,505 | 4/1990 | Bullard et al. . |
| 5,207,508 | 5/1993 | Koutsis, Jr. et al. . |
| 5,330,250 * | 7/1994 | Reyes ........................... 297/256.17 X |
| 5,346,278 * | 9/1994 | Dehoudt ...................... 297/219.12 X |
| 5,547,250 * | 8/1996 | Childers ......................... 297/256.17 |
| 5,642,917 * | 7/1997 | Gerger ........................ 297/DIG. 6 X |
| 5,829,829 | 11/1998 | Celestina-Krevh . |
| 5,829,835 | 11/1998 | Rogers et al. . |
| 5,855,412 | 1/1999 | Smith et al. . |
| 5,938,336 | 8/1999 | King . |
| 5,967,607 * | 10/1999 | Waldroup ......................... 297/256.17 |
| 5,988,744 * | 11/1999 | Franchak ......................... 297/256.17 |

FOREIGN PATENT DOCUMENTS

| | | |
|---|---|---|
| 0 233 097 | 8/1987 | (EP) . |
| 722867 | 2/1955 | (GB) . |
| 943965 | 12/1963 | (GB) . |
| 1264919 | 2/1972 | (GB) . |
| 2 061 712 | 5/1981 | (GB) . |

* cited by examiner

Primary Examiner—Peter R. Brown
(74) Attorney, Agent, or Firm—Richard C. Litman

(57) ABSTRACT

A support for a baby is disclosed having a flap portion, a seat portion, and a handle portion. The flap portion has at least one pocket. A pair of cushion blocks is removably attached to the seat portion, one on each side of the baby. The seat portion has a central area between the cushion blocks, composed of a non-slip material. Straps are included for securing the baby in a shopping cart or other seat. A handle is preferably attached to the handle portion for carrying the support. The cushion blocks support a baby too young to sit up alone in a seated position. Since the cushion blocks are removably attached on two surfaces, the support can also be laid flat for use as a changing pad.

14 Claims, 5 Drawing Sheets

SUPPORT FOR BABY

BACKGROUND OF THE INVENTION

1. Field of the Invention

The present invention relates to changing pads, and to seats with strapping devices for infants.

2. Description of the Related Art

Many caregivers of infants find it convenient to carry very young infants in a semi-reclining position in a carry seat. Such a seat provides excellent support for an infant who cannot yet sit up alone. However, as the infant grows heavier, carrying the infant in this manner quickly becomes difficult and awkward. The seats for children provided in typical strollers, high chairs, shopping carts, and the like are designed for older babies and toddlers and do not provide sufficient support for an infant who cannot sit up alone.

The child seats of shopping carts have other problems. Babies often find them uncomfortable. Safety for the child is a well-known problem with shopping carts. While some stores provide safety belts to surround the child's waist, many others do not. Even if a waist belt is provided, a very small or active child may be able to slip through it, since the surface of a typical seat in a shopping cart has a slippery surface.

Strapping devices are known for securing babies in shopping carts; however, such devices are often bulky and take up space in a diaper bag. Further space in a diaper bag is taken up by the need for carrying a separate changing pad.

U.S. Pat. No. 3,489,194 to Hoover discloses a diaper changer bag. The bag has a rectangular cushioned pad with zippers on the sides and handles on the ends. Cushioning is provided by polyurethane foam, which can be removed for washing. Unfolded flat, the pad provides a diapering station. Folded, the pad forms a compact unit like a brief case. A separate inside pouch with compartments for bottles, soiled diapers, and other items fits inside the foldable pad.

U.S. Pat. No. 4,566,130 to Coates teaches a diapering station which can also be used as a carrying bag for infant accessories. The station has a middle section, two end sections which fold over the middle section, and a handle for carrying. A removable pouch stores dirty diapers and provides a waterproof changing surface. Diapers are used for cushioning. A pocket in one of the end sections stores clean diapers, bottles, and other infant accessories.

U.S. Pat. No. 4,698,862 to Mairs discloses a combination bassinet, baby carrier, and diaper bag which includes a shell, a resilient pad, and a padded liner. The shell is collapsible and can be used alone as a tote bag for carrying baby items, or with the pad and liner as a padded bassinet. The shell may have pockets for storage. The liner can be used alone as a front or back carrier for carrying a baby strapped to an adult's torso. Straps hold the baby in a vertical position when used as a carrier. The liner can also be used as a car seat cover.

U.S. Pat. No. 4,723,300 to Aranow teaches a convertible tote bag. Zipped open and unfolded flat, the bag can be used for diapering and includes an absorbent pad under the baby. The bag has a carrying handle at each end and exterior pockets. A flap with Velcro (trademark) fasteners holds the bag shut.

U.S. Pat. No. 4,886,150 to Fitzsimmons discloses a baby changing device and diaper bag. The device includes a rectangular panel with a central change area, bordered by a pair of end panels containing pockets. For carrying, the ends are folded over the change area to form a compact, purse-like article. Handles are provided at each end of the change area. A changing pad is attached to the change area with Velcro (trademark) strips.

U.S. Pat. No. 4,917,505 to Bullard et al. discloses a rectangular pad with an outer liquid-impervious layer and an inner cushioning layer of plastic foam. Unfolded, the pad serves for diaper changing. The pad can be folded to form a bag, or into a U-shaped configuration for use as a sun visor on a stroller or other carrier. Fastening strips allow the pad to be fastened to the carrier or secured closed. The pad includes a pocket for insect netting.

U.S. Pat. No. 5,207,508 to Koutsis, Jr. teaches a convertible sack which in various embodiments functions as a tote, blanket, diaper bag, changing pad, seat, tent, etc. The sack is converted from a flat surface to a sack by pulling a cord through access openings.

U.S. Pat. No. 5,829,829 to Celestina-Krevh discloses an adjustable and removable head support for an infant or toddler, for use in a car seat. The support has an upper body portion with two flanking pillow sections, a pair of harness belt apertures, a central portion, and a lower portion with a pair of flanking leg pillow sections. The upper pillow sections are attached by flexible securing straps so the lateral separation can be adjusted. A soft foam material serves as padding.

U.S. Pat. No. 5,829,835 to Rogers et al. teaches a convertible shopping cart seat liner and diaper bag. The seat liner has a flexible container with a bottom and front, rear, and side walls attached to the four edges of the bottom. The container is sized and shaped to flexibly position within a shopping cart seat. An attached handle allows for carrying. The seat liner may include pockets for child-related items. A detachable infant pad may be used to extend over the leg openings in the front wall when the liner is used as a diaper bag. The pad may also be used to line the bottom of the liner, allowing a very small infant to lie down, surrounded by the front, rear, and side walls. A securing strap may be included for securing the liner to a shopping cart, as well as a child restraining strap to secure the child. An auxiliary bag may be snapped to the liner for more storage space for diaper items, toys, etc.

U.S. Pat. No. 5,855,412 to Smith et al. teaches a shopping cart seat cushion and diaper bag. The cushion has a rectangular seat panel and foldable front, back, and side panels attached to the seat panel. A top panel depends from the back panel and may fold over a shopping cart seat backrest. A separate diaper changing cushion may be removably attached to the upper surface of the seat panel to provide additional comfort for the child. The panels fold up into a rectangular diaper bag and are secured with Velcro (trademark) attachments. The side panels have storage pockets for diapers and the like. The top panel also has an accessory panel with storage compartments.

United Kingdom Patent Application No. 2 061 712 teaches a bag with a detachable absorbent sheet for changing an infant. The sheet may be attached with Velcro, and is secured in its store position with zips.

U.S. Pat. No. 5,938,336 to King discloses a tote bag having a central U-shaped compartment and two side storage panels; the bag converts to a seat cover for use on chairs and the like. British Patent No. 722,867 to Bornstein discloses a mattress which can be folded to convert it to a container. British Patent No. 943,965 to Askaroff discloses a resilient mat for changing a baby, having compartments for toilet requisites. British Patent No. 1,264,919 to Hudson teaches a cushion which can be folded to form a carrier bag.

European Patent 0 233 097 to Achour shows a sack which can be zipped open to form a flat surface.

None of the above inventions and patents, taken either singularly or in combination, is seen to describe the instant invention as claimed. Thus a support for a baby solving the aforementioned problems is desired.

SUMMARY OF THE INVENTION

The present invention is a support for a baby having a flap portion, a seat portion, and a handle portion. The flap portion has at least one pocket. A pair of cushion blocks is removably attached to the seat portion, one on each side of the baby. The seat portion has a central area between the cushion blocks, composed of a non-slip material. Straps are included for securing the baby in a shopping cart or other seat. A handle is preferably attached to the handle portion for carrying the support. The cushion blocks support a baby too young to sit up alone in a seated position. Since the cushion blocks are removably attached on two surfaces, the support can also be laid flat for use as a changing pad.

Accordingly, it is a principal object of the invention to provide a support for a baby which provides support in various types of seats for a baby too young to sit alone.

It is another object of the invention to provide a support which secures a baby in a seat and prevents the baby from slipping out of the seat.

It is a further object of the invention to provide a support which can be used as a changing pad.

Still another object of the invention is to provide a support which can be easily washed.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
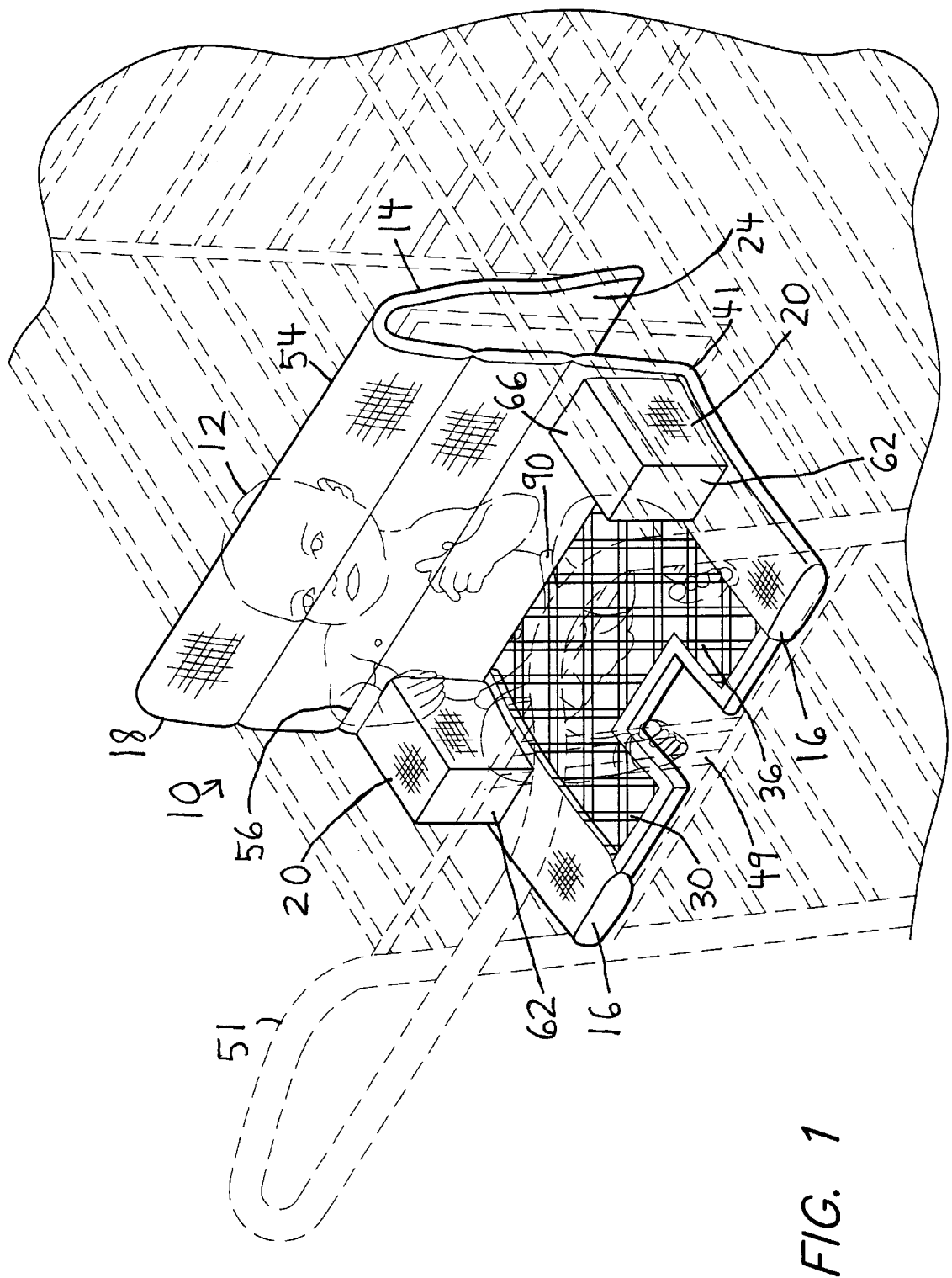
FIG. 1 is an environmental, perspective view of a support for a baby according to the present invention.

The present invention is a support 10 for a baby 12 having a pad assembly 13. The pad assembly includes a flap portion 14, a seat portion 16, a handle portion 18, an upper surface 15, and a lower surface 17. Each of a pair of cushion blocks 20 is removably attached to the seat portion 16. The support 10 includes strap means for releasably securing the baby, and handle means for carrying.

Preferably the pad assembly, the flap portion, the handle portion, and the seat portion are each generally rectangular in shape. The long axis of the pad assembly 13 is perpendicular to the long axes of the flap portion 14, the seat portion 16, and the handle portion 18. The pad assembly is preferably about 36 inches (91 cm) long and 18 inches (46 cm) wide. The flap portion, handle portion, and seat portion are separated by seams or fold lines.

The flap portion 14 is preferably constructed of first and second layers of fabric 22 and 24, separated by a padding layer 26. See FIG. 4. The flap portion 14 has a distal edge 23, a proximal edge 25, and first and second side edges 27 and 29. See FIG. 2.

The fabric may be any comfortable, machine washable material, such as cotton or a cotton/synthetic blend. The padding layer may be polyester quilt batting or the like.

The flap portion contains at least one pocket, which may take any of a wide variety of forms. One preferred arrangement is a layer of pocket fabric 28 extending adjacent to and parallel to the first fabric layer 22. The pocket fabric is attached to the distal edge 23 of the flap portion. See FIG. 4. The pocket preferably extends substantially the full length of the flap portion 14, parallel to the distal edge.

Figure 2:
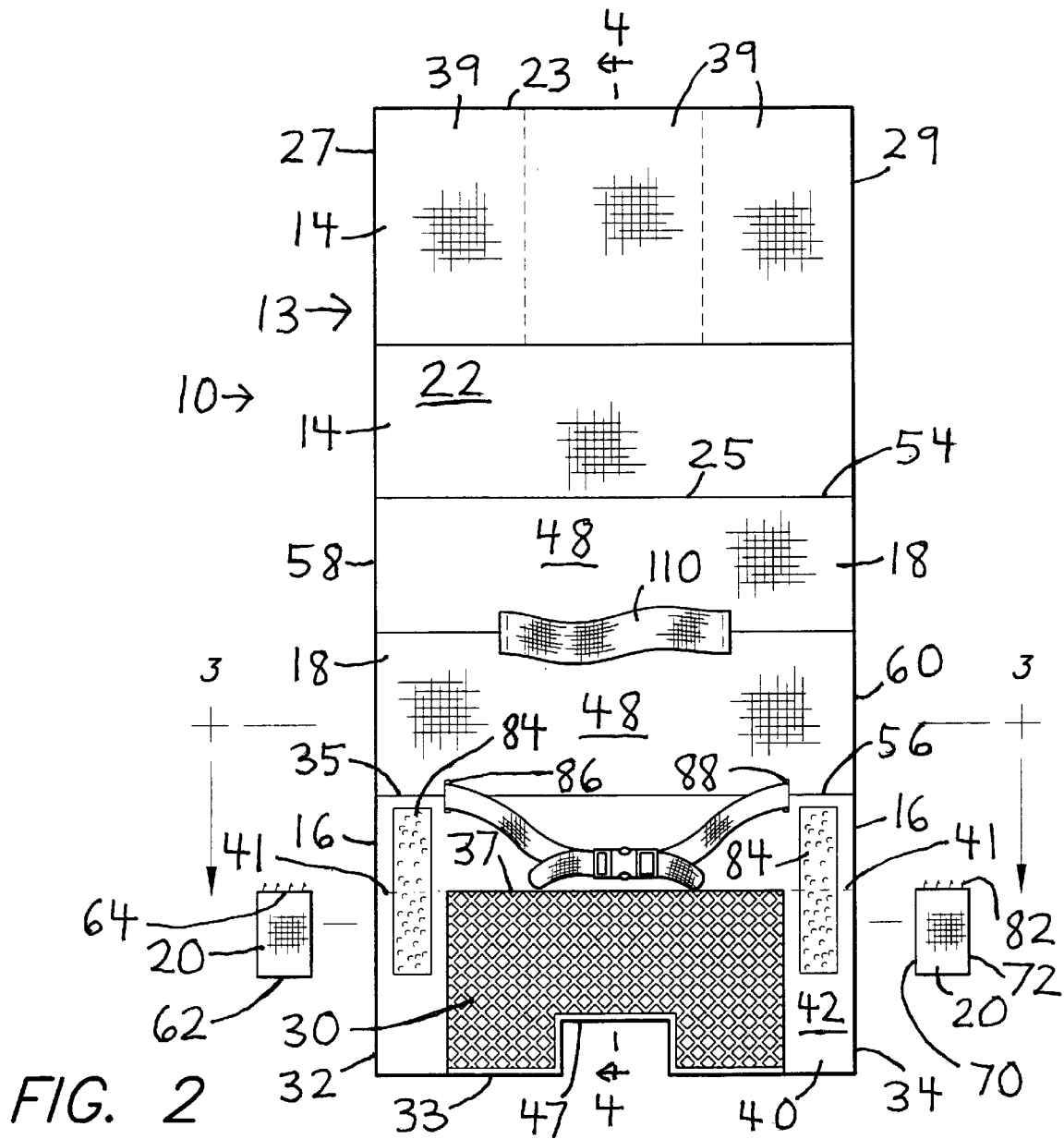
FIG. 2 is an exploded, plan view of the upper surface of an unfolded support.

The pocket ideally is divided by stitching into at least two compartments 39. At least three compartments 39 are preferred, as shown in FIG. 2. The size of each compartment may be adjusted if desired to the size of specific baby items intended to be contained, such as bottles. This pocket arrangement is easily manufactured, holds baby items securely when the support is carried, and keeps the items out of the way when the support is in use. The pocket compartments are suitable for carrying diapers, wipes, bottles, toys, and baby food, as well as shopping lists and the like.

Figure 4:
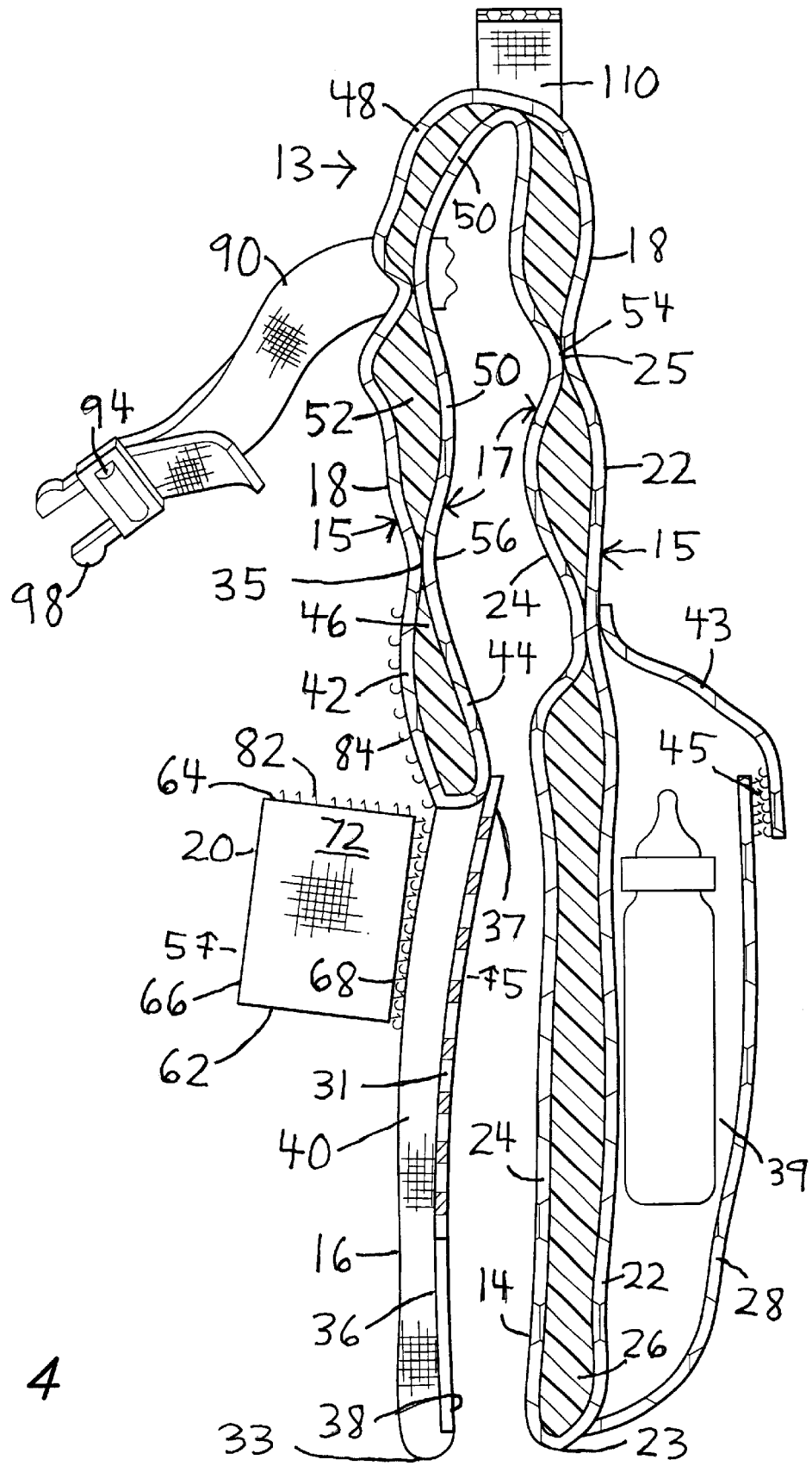
FIG. 4 is a cross-sectional view of a support being carried, taken along line 4—4 of FIG. 2.

The pocket may include a cover flap 43, as shown in FIG. 4. The cover flap 43 preferably has a securing means to releasably hold the pocket closed. The securing means may be a hook and loop fastener 45, as in FIG. 4.

The seat portion 16 has a central area 30 and first and second side edges 32 and 34. The seat portion also has a distal edge 33 and an opposite proximal edge 35. The central area has a proximal edge 37. The central area 30 is composed of a non-slip material 31. The non-slip material has a first non-slip surface 36 and a second non-slip surface 38 opposite the first non-slip surface. See FIG. 4. The first non-slip surface 36 is in contact with the baby's bottom when the support is used to cover a seat, such as a shopping cart seat. The second non-slip surface 38 is in contact with the seat itself. See FIG. 1. The central area 30 is preferably about 9 inches (23 cm) by 9½ inches (24 cm).

While the remainder of the pad assembly is preferably composed of at least two and ideally three layers, the central area 30 is preferably composed of a single layer of non-slip material 31. This assures that the two surfaces 36 and 38 cannot slide past each other. However, two non-slip layers may be used if the layers are securely stitched or otherwise secured together.

The central area 30 of the seat portion preferably is U-shaped or generally U-shaped, as shown in FIGS. 1 and 2. The notch 47 is adjacent to the distal edge 33. The seats of strollers, high chairs, shopping carts, and the like often have a central strap or member such as the central member 49 shown for the shopping cart 51 of FIG. 1. The central strap or member fits between the baby's legs. The notch 47 is adapted to allow the seat portion 16 to more easily fit seats with a central strap or member, while maintaining maximum contact between the baby's legs and the non-slip material of the central area 30.

The non-slip material 31 is preferably composed of non-slip rug cushion material The rug cushion material may be polyester scrim coated with PVC. Suitable rug cushion material is available under the trademark Mighty Gripper. The non-slip material may also be fabric studded or covered with a pattern of PVC or other high-friction materials, similar to non-slip socks and gloves.

The central area 30 of the seat portion 16 is preferably surrounded on each side by a peripheral area 40. See FIG. 2. The peripheral area preferably is U-shaped and surrounds the central area 30 on three sides, as shown in FIGS. 1 and 2. The base of the U includes the proximal edge 35, while the two arms of the U include the first and second side edges 32 and 34 respectively. Alternatively, the peripheral area 40 may consist of a pair of strips flanking the central area 30, and the proximal edge 37 of the central area may coincide with the proximal edge 35 of the seat portion.

The peripheral area is preferably composed of two layers of fabric 42 and 44 separated by a padding layer 46. See FIG. 5. The fold line 41 may extend from the proximal edge 37 of the central area 30 across the peripheral area 40.

The handle portion 18 preferably has a first fabric layer 48 and a second fabric layer 50 opposite the first fabric layer. Preferably a padding layer 52 is located between the first and second fabric layers 48 and 50. The handle portion 18 also has a flap edge 54, a seat edge 56 opposite the flap edge 54, and a first side edge 58. The second side edge 60 is opposite the first side edge 58. The flap edge 54 is attached to the proximal edge 25 of the flap portion 14. The seat edge 56 is attached to the proximal edge 35 of the seat portion 16. See FIGS. 2 and 4.

The seat and flap edges 56 and 54 are preferably parallel to the proximal and distal edges 25, 23, 33, and 35 of the flap portion and the seat portion respectively. The seat and flap edges 56 and 54 are also preferably parallel to the fold line 41 of the seat portion 16 and the proximal edge 37 of the central area 30. The first and second side edges 32 and 34, 27 and 29, and 58 and 60 of the seat portion, the flap portion and the handle portion respectively are preferably continuous and perpendicular to the seat and flap edges 56 and 54 and to the proximal and distal edges 25, 23, 33, and 35.

The support 10 has a pair of cushion blocks 20. Each cushion block 20 has a front surface 62, a rear surface 64, a top surface 66, a bottom surface 68, and first and second side surfaces 70 and 72. See FIGS. 2, 4, and 5. Each of the bottom and the rear surfaces 68 and 64 of each cushion block 20 is removably attached to the seat portion 16 near one of the side edges 32 or 34 of the seat portion 16. Preferably the cushion blocks 20 are attached to the peripheral area 40 of the seat portion. The cushion blocks are preferably about 4 inches (11 cm) high, 3 inches (7.5 cm) wide, and 5 inches (12 cm) long.

Figure 5:
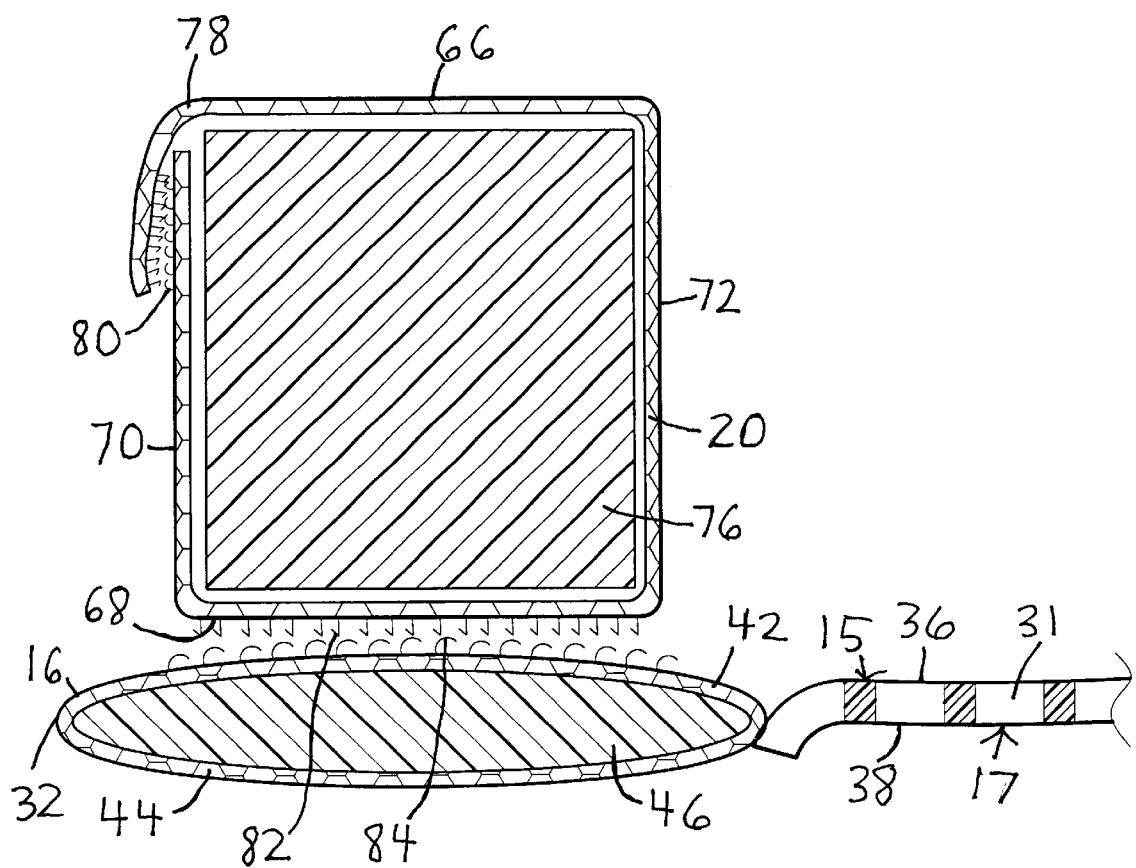
FIG. 5 is a cross-sectional, detail view of a cushion block and its attachment, taken along line 5—5 of FIG. 4.

The cushion blocks 20 may be of any suitable material for cushioning and supporting a baby. Preferably each of the cushion blocks 20 includes an inner cushion 76 and an outer cover 78. The outer cover 78 is preferably composed of the same fabric as the fabric layers 22, 24, 42, 44, 48, and 50. The outer cover 78 ideally has a securing means to releasably secure the inner cushion 76 within the outer cover. This allows the inner cushion to be removed for washing. For example, FIG. 5 shows the outer cover secured by hook and loop fastener 80. The inner cushion may be of polyurethane foam or other suitable synthetic foam.

Each cushion block 20 is preferably removably attached to the seat portion by one or more connecting hook and loop fasteners. Each of the connecting hook and loop fasteners has a hook portion 82 and a loop portion 84. Preferably the loop portion 84 of each of the connecting hook and loop fasteners is attached to the seat portion 16. The hook portion 82 of each of the connecting hook and loop fasteners is attached to one of the cushion blocks 20. This arrangement assures that the baby will not be scratched by the hooks when the cushion blocks are removed. The loops are softer to the touch than the hooks.

The hook and loop portions 82 and 84 of the connecting hook and loop fasteners are preferably wide enough to allow the width between the cushion blocks to be adjusted. This helps to fit the cushion blocks to the size of the baby. As the baby grows older and is able to sit without support, the cushion blocks can be removed entirely. The support continues to provide a secure, non-slip attachment to many types of seats, as well as serving as a changing pad and diaper bag.

The hook and loop portions 82 and 84 preferably extend the entire length of the bottom and rear surfaces 68 and 64 of each cushion block. This maintains a secure attachment between the cushion blocks and the seat portion when the baby is in a seat.

Figure 3:
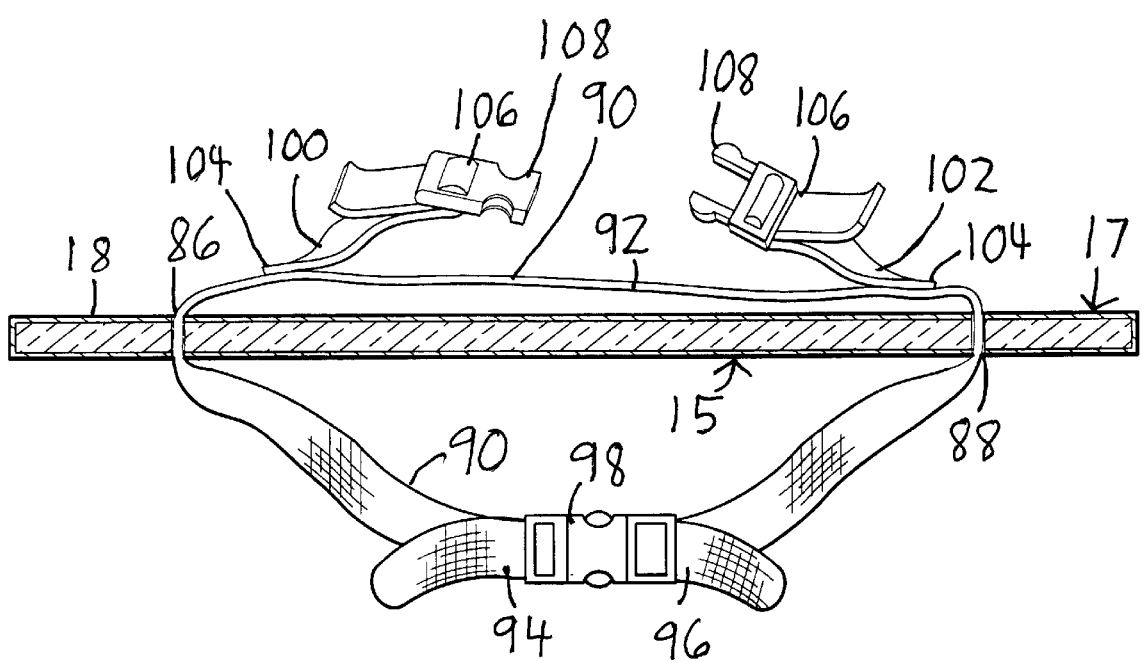
FIG. 3 is a detail view, partly in cross-section, taken along line 3—3 of FIG. 2.

The support 10 includes strap means for releasably securing the baby. Preferably the pad assembly 13 has first and second slits 86 and 88. See FIGS. 2 and 3. Preferably the slits 86 and 88 are located near the seat edge 56 of the handle portion. This location helps to hold the baby securely without causing the pad assembly to bunch up.

The strap means preferably includes a first strap 90 having a central portion 92 and first and second ends 94 and 96. See FIG. 3. The strap is preferably nylon. The central portion 92 of the first strap 90 is located near the lower surface 17 of the pad assembly. The first and second ends 94 and 96 of the first strap extend through the first and second slits 86 and 88 respectively. The first and second ends 94 and 96 of the first strap are releasably secured to each other by a first clip 98 to form a loop. The first clip 98 is preferably a parachute clip or similar fastener.

The strap means preferably also includes a second strap 100 and a third strap 102. See FIG. 3. Each of the second and third straps 100 and 102 has a proximal end 104 and a distal end 106. Each proximal end 104 is attached to the central portion 92 of the first strap 90. The distal ends 106 of the second and third straps 100 and 102 are releasably secured to each other by a second clip 108. The second clip 108 is preferably a parachute clip identical to the first clip 98.

The second clip 108 allows the support to be easily attached to a seat. For example, the second clip may be fastened around one or more bars of a shopping cart seat behind the baby, while the first strap is secured around the baby. This arrangement holds the baby firmly in place, without requiring that the first strap be threaded through the slits 86 and 88 each time the support is used. The baby cannot climb out of the seat or fall.

The support 10 includes handle means for carrying the support. The handle means preferably includes a handle 110 attached to the upper surface 15 of the handle portion 18 of the pad assembly. Ideally the widths of the flap portion, the handle portion, and the seat portion are approximately equal. The handle preferably is attached approximately half-way between the flap edge 54 and the seat edge 56 of the handle portion 18. This location provides for good balance, making the support easier to carry. The weight of the cushion blocks 20, the non-slip material 31, and the straps 90, 100 and 102 is roughly balanced by the weight of diapers and other baby supplies carried in the pocket compartments 39.

The support keeps a baby who cannot yet sit up alone upright and supported. The non-slip material prevents the baby from sliding around, while the cushion blocks support him on either side. This combination works to prevent the baby from slumping into an uncomfortable position, without requiring that the cushion blocks fit tightly against the baby on both sides. The support makes the seats of standard strollers, high chairs, shopping carts, and the like more comfortable and secure for infants.

In a shopping area or restaurant the support can be simply folded over a shopping cart or high chair, making sure the seat is flat and the cushion blocks are in line with the seat. The flap portion is folded over the back of the seat, as in FIG. 1. The baby is then placed in the seat and fastened in, and the second clip is fastened to the seat. Very little time is required.

When the baby needs changing, the pad assembly is easily unfolded by separating the hook portion 82 of the rear surface 64 of each cushion block from its corresponding loop portion 84. See FIGS. 4 and 2. The hook portion 82 of the bottom surface 68 can remain in place while the baby is changed. The cushion blocks help to prevent the baby from rolling off a changing table. The padding layers and the non-slip material cushion the baby during the changing process. The pocket compartments 39 keep the necessary supplies exactly where they are needed. A separate changing pad and diaper bag do not have to be carried.

The support is easily cleaned. Once the inner cushions of the cushion blocks are removed, the remainder of the support can be easily machine washed.

It is to be understood that the present invention is not limited to the embodiments described above, but encompasses any and all embodiments within the scope of the following claims.

We claim:

1. A support for a baby comprising:
   (a) a pad assembly including:
      (i) a flap portion containing at least one pocket;
      (ii) a seat portion having a central area and first and second side edges, the central area being composed of a non-slip material, the non-slip material having a first non-slip surface and a second non-slip surface opposite the first non-slip surface;
      (iii) a handle portion having a flap edge, a seat edge opposite the flap edge, a first side edge, and a second side edge, the flap edge being attached to the flap portion, the seat edge being attached to the seat portion; and
      (iv) an upper surface, an opposite lower surface, a first slit, and a second slit;
   (b) a pair of cushion blocks, each cushion block having a front surface, a rear surface, a top surface, a bottom surface, and first and second side surfaces; each of the bottom and the rear surfaces of each cushion block being removably attached to the seat portion near one of the side edges of the seat portion;
   (c) strap means for releasably securing the baby, the strap means includes a first strap, a second strap and a third strap, the first strap having a central portion, a first end and a second end, the central portion of the first strap being located near the lower surface of the pad assembly, the first end and second end of the first strap extend through the first slit and second slit, respectively, and are releasably secured to each other by a first clip, the second strap and third strap each includes a proximal end and a distal end, each proximal end being attached to the central portion of the first strap, and each distal end of the second strap and third strap being releasably secured to each other by a second clip; and
   (d) handle means for carrying.

2. The support according to claim 1, wherein the pad assembly, the flap portion, the handle portion, and the seat portion are each generally rectangular in shape.

3. The support according to claim 1, wherein the handle portion includes a first fabric layer, a second fabric layer, and a layer between the first and second fabric layers.

4. The support according to claim 1, wherein each of the cushion blocks includes an inner cushion and an outer cover, the outer cover being composed of fabric, the outer cover having a securing means to releasably secure the inner cushion within the outer cover.

5. The support according to claim 1, wherein each of the flap portion, the handle portion, and the peripheral area of the seat portion includes a first fabric layer and a second fabric layer, and each of the first and second fabric layers of the flap portion, the handle portion, and the peripheral area is composed of fabric.

6. The support according to claim 1, wherein the pad assembly is adapted to cleaning by machine washing.

7. The support according to claim 1, wherein the pocket extends substantially the full length of the flap portion, and the pocket is divided by stitching into at least two compartments.

8. The support according to claim 1, wherein the pocket includes a cover flap, and the cover flap has a securing means to releasably hold the pocket closed.

9. The support according to claim 1, wherein the central area of the seat portion is U-shaped.

10. The support according to claim 1, wherein the central area of the seat portion is composed of non-slip rug cushion material.

11. The support according to claim 1, wherein each cushion block is removably attached to the seat portion by at least one connecting hook and loop fastener, and each of the connecting hook and loop fasteners has a hook portion and a loop portion.

12. The support according to claim 11, wherein the loop portion of each of the connecting hook and loop fasteners is attached to the seat portion, and the hook portion of each of the connecting hook and loop fasteners is attached to one of the cushion blocks.

13. The support according to claim 1, wherein the handle means includes a handle attached to the upper surface of the handle portion.

14. The support according to claim 13, wherein the widths of the flap portion, the handle portion, and the seat portion are approximately equal, and the handle is attached to the upper surface of the handle portion approximately half-way between the flap edge and the seat edge of the handle portion.

* * * * *